April 2, 1940.　　　R. G. REYNOLDSON　　　2,196,080
METHOD FOR FORMING MATERIALS
Filed July 18, 1938　　　2 Sheets-Sheet 1
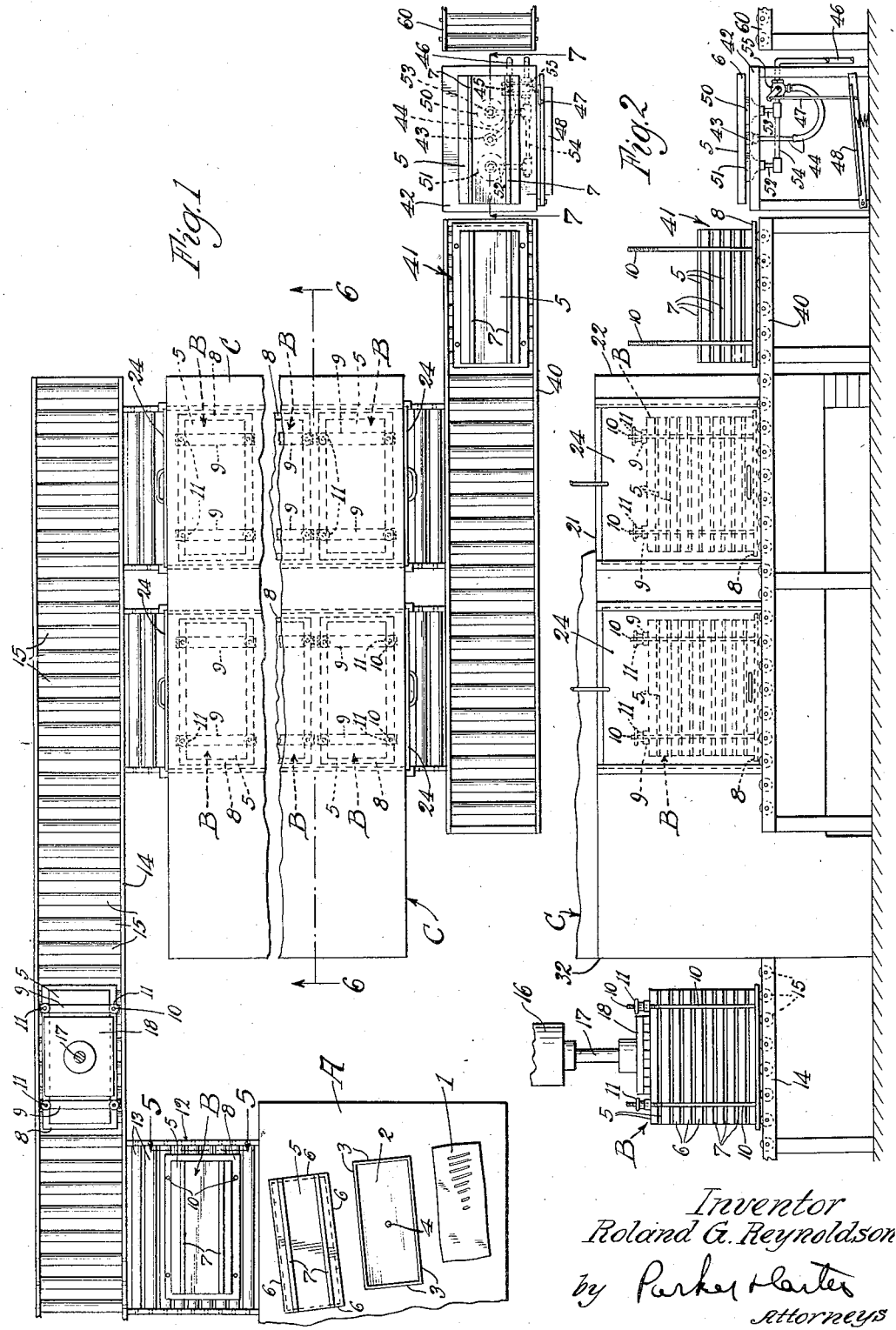
Inventor
Roland G. Reynoldson
by Parker & Carter
Attorneys April 2, 1940.  R. G. REYNOLDSON  2,196,080
METHOD FOR FORMING MATERIALS
Filed July 18, 1938  2 Sheets-Sheet 2
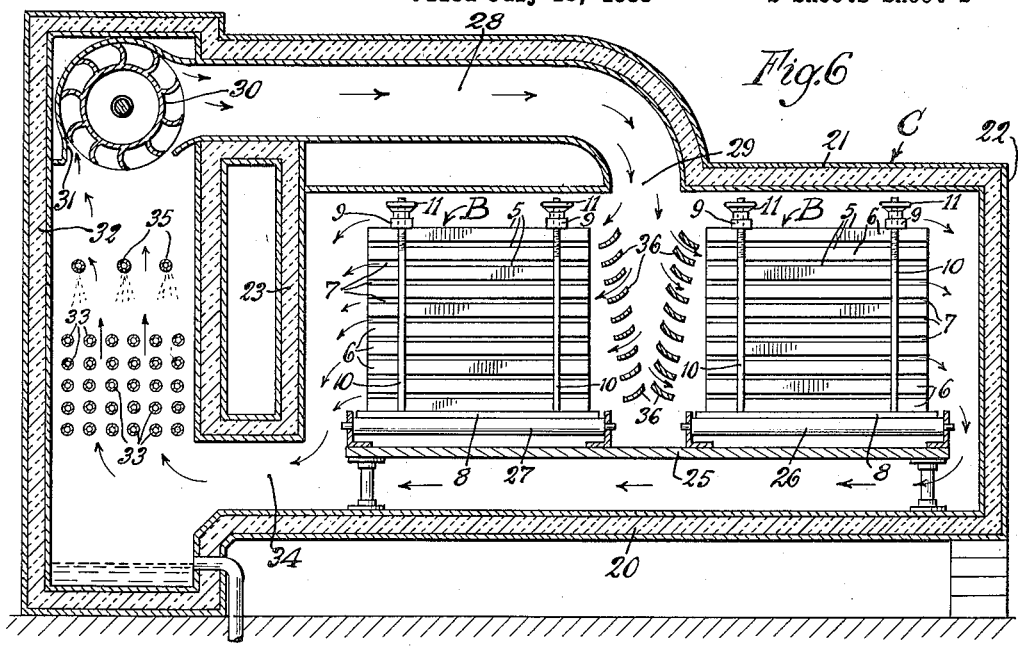
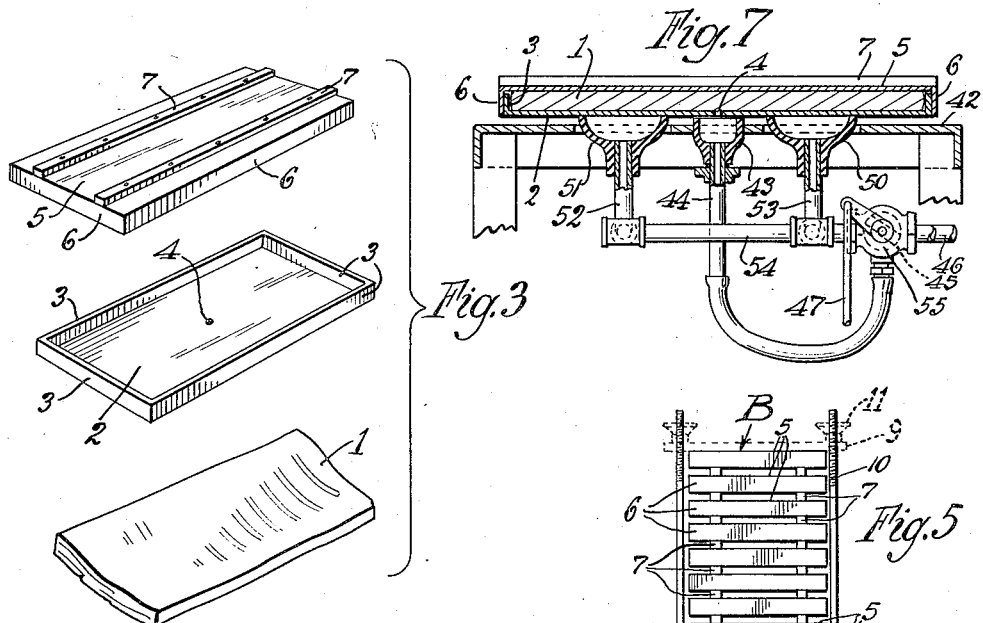
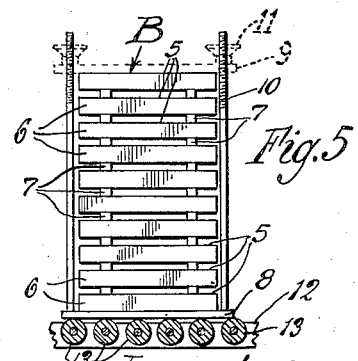
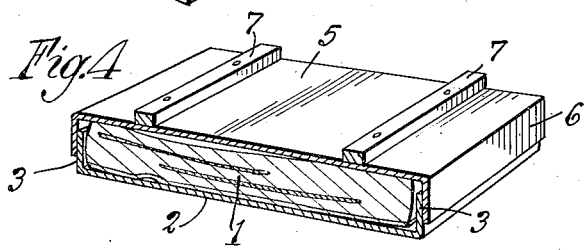
Inventor
Roland G. Reynoldson
by Parker & Carter
Attorneys Patented Apr. 2, 1940

2,196,080

UNITED STATES PATENT OFFICE 2,196,080

METHOD FOR FORMING MATERIALS

Roland G. Reynoldson, Madison, Wis.

Application July 18, 1938, Serial No. 219,756

4 Claims. (Cl. 62—170)

My invention relates to a method of handling and freezing edible articles such as bacon, and any other substances, and to apparatus for carrying out such a method.

One purpose is the provision of improved means for freezing or chilling articles, for example, but not necessarily, articles of food, including bacon.

Another purpose is the provision of means for forming food stuffs such as bacon to prevent waste in cutting.

Another purpose is to change the form of articles, for example to make thick bacon out of thin and to make thin bacon out of thick.

Another purpose is the provision of improved means for pressing bacon or the like.

Another purpose is the provision of improved means for removing bacon and other substances from containers in which it has been pressed.

Other purposes will appear from time to time in the course of the specification and claims.

I illustrate my invention more or less diagrammatically in the accompanying drawings wherein:

Figure 1 is a plan view illustrating schematically the mechanisms for carrying out the various steps of my method and the relative location of such mechanisms;

Figure 2 is a side elevation of the structure shown in Figure 1, with parts broken away;

Figure 3 illustrates the container in which the bacon is positioned for pressing and subsequent freezing;

Figure 4 is a perspective view partially in section illustrating the bacon within the assembled containers shown in Figure 3;

Figure 5 is a section on the line 5—5 of Figure 1;

Figure 6 is a section on the line 6—6 of Figure 1; and

Figure 7 is a section on the line 7—7 of Figure 1, on an enlarged scale.

Like parts are indicated by like symbols throughout the specification and drawings.

It will be understood that stated broadly my method involves the assembly of pieces of bacon or other substances in containers; the stacking of said containers, the application of pressure to the stack and the maintenance of the stack under compression; the passage of the stack, while the compression is maintained, through a freezing or chilling zone; the removal of the individual containers from the stack subsequent to the freezing operation and after the pressure has been released; and the removal of the bacon from the individual containers.

Referring for example to Figure 1, A indicates any suitable loading platform or table. Illustrated as positioned on the table are the parts shown on a larger scale in Figure 3. 1 indicates a piece of bacon. 2 is a container shown as having an open top and side walls 3. 4 indicates a hole in the bottom of the container. 5 indicates a top member having circumferential downwardly extending walls 6 and being provided with spacing cleats 7. The operator places the piece of bacon 1 in the lower container or bottom 2 and positions the top 5 thereupon, as shown in Figure 4. A stack of such containers is illustrated in Figure 5 as positioned on a bottom clamp member 8.

This container, as shown in Figure 3 and as will later appear, is adapted for the pneumatic or pressure removal of articles within the container after treatment, the hole 4 being adapted to permit the entry of air under pressure within the container and beneath the article contained therein, whereby the top of the container and the article may be pneumatically expelled from or loosened from the bottom. The cleats 7 are important as spacing the containers apart whereby cold air may be circulated between adjacent containers, when they are stacked, for chilling or freezing or for other purposes.

After any suitable number of containers have been positioned upon the bottom clamp member 8, as shown in Figure 5, top clamp members 9 may be applied and the members 8 and 9 can be drawn together by any suitable means, for example the compression rods 10 with the nuts 11 screw-threaded to the upper ends of the rods. It will be understood that the particular details of the pressure maintaining means are a matter of choice but the one shown serves as an illustrative example.

The stack thus produced, indicated as a whole as B in Figure 5, may be moved on any suitable conveyor table 12, which is provided with a plurality of supporting rollers 13. These permit the easy manual movement of the unit B upon the adjacent similar conveyor table indicated as 14, with its rollers 15. 16 diagrammatically illustrates any suitable press member having a plunger 17 and a plunger head 18 adapted to engage the top tray of the stack. Any suitable means may be employed to thrust the members 17 and 18 downwardly against the top tray to compress the individual members 2 and 5 together against the bacon. When the stack is compressed, the nuts 11 may be rotated into bottom position in order substantially to maintain the pressure on the individual slabs of bacon during the freezing period.

It will be clear from Figure 4 that the thickness of the bacon slab 1 is somewhat greater than the height of the flanges 3 or 6, whereby in response to the thrust of the press each individual piece of bacon is compressed between the top and bottom member which confines it. This causes the bacon to spread out within the container 2 and to conform to the container and take a completely or substantially completely rectangular form. The result is that the finished bacon piece can be evenly sliced with a minimum of wastage, and the bacon can be changed in all three dimensions. Since the containers are uniform in size, or of a predetermined size, the bacon will be formed to that size. If the containers are uniform, all of the bacon pieces will also be uniform in size.

The unit B, after it has been subjected to pressure and while the pressure is still maintained by the members 10 and 11, may be moved along the conveyor 14 into alinement with the freezing unit generally indicated as C and shown in vertical section in Figure 6. As therein shown, it includes a freezing chamber defined by insulated walls. I illustrate a bottom wall 20, a top wall 21, a side wall 22, and an opposite side wall 23. The end walls, not herein shown in detail, are provided with gates 24 which can be raised to permit the insertion and removal of the units B and which can be lowered to maintain the refrigeration chamber closed, there being such gates at each end of the unit C.

Located within the chamber is any suitable supporting platform generally indicated as 25, which is shown as having roller tracks 26, 27 alined with the gates 24. It will be understood that whereas I have illustrated two such tracks, a single track might be employed or a larger number of tracks, but I find two tracks to be a convenient solution of my problem. In the two-track form herein shown, cold air is admitted along a passage 28 which communicates as at 29 with the interior of the refrigeration chamber along a line in the top wall 21 about midway between the tracks 26, 27. Thus a current of cold air is delivered downwardly into the chamber in a generally vertical downward direction along a center line between the two tracks.

The means for supplying the air may be widely varied. I illustrate, however, fans or blowers 30 mounted in any suitable fan housing 31 within an outer chamber 32. Any suitable means may be employed for driving these fans. Preferably such fans and blowers are highly speeded up in relation to conventional practice in circulating cold air in refrigeration. In practice I have speeded up the fans about two hundred per cent over conventional practice in order to obtain a violent and rapid air circulation in the freezing chamber, in order to obtain quick freezing. 33 indicates any suitable cooling coils, the details of which do not of themselves form part of the present invention. The used air is drawn outwardly from the refrigeration chamber along the passage 34 and is drawn upwardly through the refrigeration coils 33 past the brine delivery spray pipes 35 and thence upwardly through the fan and back down the passage 29. The brine pipes may be omitted and under some circumstances may be disadvantageous as the rapid movement of air may tend to carry brine over into the freezing chamber.

As will be clear from Figures 1 and 6, a multiple of the units B may be positioned along the tracks 26 and 27. I illustrate longitudinally extending baffles 36 along the path of delivery of cold air. These baffles are downwardly and outwardly curved or inclined in such fashion as to direct a circulation of cold air laterally outwardly against the units B. Since the individual containers are spaced apart by the spacers or cleats 7, there is an air passage or space between each bacon container. This provision of a space or passage between each adjacent container is important since it subjects all sides of each container to the passage of the rapidly moving blast of cold air. The baffles 36 are preferably so shaped and spaced as to deliver jets or currents of cold air at extremely high velocity through these spaces. As will be clear from Figure 6, I may find it desirable to arrange the baffles in two inwardly converging rows. The size, shape and location of the baffles, however, may be widely varied.

The operator in practice simply fills the refrigeration chamber with as many of the units B as it will take, or a smaller number if desired, closes the gates 24, and causes the cold air to circulate downwardly through the passage 29 and through the baffle system and thus about each 30 of the units B. After the units have been subjected to the influence of the cold air for a suitable period, depending upon the degree of freezing or chilling desired, the gates 24 may be opened and the units may be moved out upon the roller conveyor 40. They may be moved along such conveyor to the position shown at 41 in Figures 1 and 2. There the nuts 11 may be unscrewed and the top clamp member removed and the operator can then take the individual containers off one by one.

It will be recalled that each container has an aperture 4 in the bottom. Such container may be positioned upon the handling or unloading platform 42 with the hole 4 alined with a cup 43. This cup may be of rubber or any other suitable substance to maintain a tight connection with the bottom of the container 2. 44 indicates an air pressure line in communication with the cup 43 and extending to any suitable source of air pressure. 45 indicates a valve controlling such line 44 and 46 is a line to the pressure source. 47 is an operating rod for the valve 45 which may be controlled manually or by a foot lever or pedal 48 as shown in Figure 2 whereby the operator can control the delivery of air pressure by his foot. Any suitable means may be employed for biasing the valve 45 to the closed position whereby it is operated only when the operator presses down on the pedal 48.

50, 51 are suction cups mounted on the support 42 which is apertured to permit their passage therethrough. 52, 53 are suction connections to a suction line 54 which is controlled by a valve 55. The valves 45 and 55 together form a multiple valve structure which may be unitarily controlled by the rod 47 and the pedal 48. Thus when the operator presses down on the pedal 48, the initial effect is to open the valve 55 and to subject the interior of the cups 50, 51 to suction. The two valves are preferably so proportioned that the pressure valve 45 is not opened until after the suction valve so that the effect of the initial downward movement of the pedal 48 is to apply suction without yet applying pressure.

The effect of the suction is to draw the container 2 downwardly firmly against the surface of the support 42. Thereafter, when the pressure valve 45 is opened and pressure is applied to the cup 43, this pressure passes through the aperture 4 and around the bacon 1 and serves to blow the top 5 upwardly from the container 2 sufficiently to free it.

I may if I wish employ in the place of the suction cups 50, 51 any other suitable means for drawing the container downwardly against the top 42 or against any suitable stop means. I may for example employ electromagnets in connection with a metal container or metal parts on the container, in such fashion that when a switch actuated by the pedal 48 is closed, the container is held firmly in position ready for the blowing action above described.

After the cover has been removed, the operator tosses it aside or puts it on any suitable conveyor or support, shown for example as the roller conveyor 60 of Figure 1. Continuation of the pressure serves to blow the bacon piece 1 loose from the bottom container 2 and the operator can toss it upon any suitable conveyor or place it on any suitable support, the details of which do not form part of the present invention.

The operator then removes his foot from the pedal 48 and, the valves being biased to closed position, the pressure and suction are simultaneously cut off and the bottom member or container can then be removed from the table 42 and put on the conveyor 60 or otherwise disposed of. Thereafter, the operator similarly opens each one of the container units until he has finished the stack shown at the position 41 in Figure 2. He can then move up a new unit B or stack and continue. The operation may be carried on relatively continuously or intermittently.

It will be realized that I have illustrated and described my invention relatively diagrammatically and that many changes may be made in size, shape, number and disposition of parts without departing from the spirit of my invention. I therefore wish my description and drawings to be taken as in a broad sense illustrative and diagrammatic, rather than as limiting me to my precise showing.

It will be understood, of course, that whereas I have described my method and apparatus as used primarily with bacon, this is but one advantage of its use as it may be employed for other food stuffs or for other articles or substances which are not in the category of food stuffs. Broadly, I deform or mold substances or articles under pressure, thereafter chill or freeze them, and thereby set them, and thereafter free the formed, set articles from the forming molds.

Stated broadly, my method includes the following sequence of steps. The bacon piece 1 is dropped in the container 2 and the cover 5 is placed upon it. Where the substance being treated is bacon, it is not rectangular when the method begins but, when positioned in a rectangular container, will be converted to rectangular form. As shown in Figure 4, the flanges 3 and 6 overlap but are each of less height than the thickness of the slab of bacon 1. The operator then assembles the units so formed into stack units B which, after they have been subjected to the press 16 and tightened up, are supplied to the freezing zone. The cleats 7 are important as preventing surface to surface contact of the individual containers, whereby a cooling circulation of air can pass at high velocity between each adjacent pair of containers, causing rapid chilling or freezing. The pressure is effective to "mold" the bacon to conform to the rectangular inner surface of the container 2 and its flanges 3 and the opposed upper face of the member 5. The bacon thus formed is subsequently chilled and set by the cold air. Thereafter, the operator has only to unpack the individual units as above described and the bacon may be taken to any suitable handling or packing zone for packing or other treatment, or for slicing.

The rectangular bacon pieces can then be sliced into uniform slices without wastage, having been formed to any predetermined size, which is an advantage over the previous custom of slicing more or less irregularly shaped pieces. The employment of irregularly shaped pieces involves the necessity either of initially trimming the piece to make it rectangular or of having irregularly shaped pieces, butts or the like.

A further advantage is that the machine and method above described may be employed to take a relatively thin slab of material, such as bacon, and make it thicker. Also, a relatively thick slab of bacon may be thinned.

I claim:

1. The method of changing the accidental shape of a unitary slab of self-sustaining edible material resulting from the separation of such slab from an edible carcass, which includes positioning said slab within a telescopic forming container, the side walls of which define the desired peripheral form of the article, subjecting the top and bottom of the slab to such pressure while in said container as to cause its lateral deformation until its edges conform to the side walls of the interior of the container and chilling the slab while in said container and thereby setting it in the desired form.

2. The method of changing the accidental shape of a unitary slab of meat resulting from the separation of such slab from an edible carcass, which includes positioning said slab within a telescopic forming container, the side walls of which define the desired peripheral form of the article, subjecting the top and bottom of the slab to such pressure while in said container as to cause its lateral deformation until its edges conform to the side walls of the interior of the container and chilling the slab while in said container and thereby setting it in the desired form.

3. The method of changing the accidental shape of unitary slabs of self-sustaining edible material resulting from the separation of such slabs from an edible carcass, which includes positioning a plurality of such slabs each within a telescopic forming container, the side walls of which define the desired peripheral form of the articles, assembling said containers with the slabs in them in a stack while spacing the opposed walls of said containers apart, subjecting the free faces of the individual slabs of material to such pressure, while positioned within said forming members and stack, as to cause their lateral deformations until the edges of each slab conform to the side walls of the interior of its associated container, and chilling the slabs while in said containers and subjected to pressure, by passing a cold gaseous medium about and between said slabs or containers and thereby setting the slabs in the desired form.

4. The method of changing the accidental shape of unitary slabs of meat resulting from the separation of such slabs from an edible carcass, which includes positioning a plurality of such slabs each within a telescopic forming container, the side walls of which define the desired peripheral form of the articles, assembling said containers with the slabs in them in a stack while spacing the opposed walls of said containers apart, subjecting the free faces of the individual slabs of material to such pressure, while positioned within said forming members and stack, as to cause their lateral deformations until the edges of each slab conform to the side walls of the interior of its associated container, and chilling the slabs while in said containers and subjected to pressure, by passing a cold gaseous medium about and between said slabs or containers and thereby setting the slabs in the desired form.

ROLAND G. REYNOLDSON.